United States Patent
Platteel

(10) Patent No.: US 8,281,801 B2
(45) Date of Patent: Oct. 9, 2012

(54) GREYWATER SYSTEM AND METHOD FOR APPLYING SAME

(75) Inventor: Johannes Donaes Jacobus Platteel, Muiden (NL)

(73) Assignee: Ecoplay International B.V., Muiderberg (NL)

(*) Notice: Subject to any disclaimer, the term of this patent is extended or adjusted under 35 U.S.C. 154(b) by 1149 days.

(21) Appl. No.: 12/089,588

(22) PCT Filed: Oct. 5, 2006

(86) PCT No.: PCT/NL2006/000504
§ 371 (c)(1), (2), (4) Date: Apr. 8, 2008

(87) PCT Pub. No.: WO2007/040394
PCT Pub. Date: Apr. 12, 2007

(65) Prior Publication Data
US 2008/0314457 A1    Dec. 25, 2008

(30) Foreign Application Priority Data

Oct. 5, 2005 (NL) .................................... 1030110

(51) Int. Cl.
*E03B 3/00* (2006.01)
(52) U.S. Cl. ..................................... 137/396; 137/205
(58) Field of Classification Search .................. 137/132, 137/153, 205, 206, 236.1, 359, 396; 141/59, 141/120, 126, 230
See application file for complete search history.

(56) References Cited

U.S. PATENT DOCUMENTS

| | | | | |
|---|---|---|---|---|
| 3,188,656 A | * | 6/1965 | Drager | 4/415 |
| 3,915,857 A | * | 10/1975 | Olson | 210/668 |
| 6,328,882 B1 | * | 12/2001 | Rosenblatt | 210/104 |

FOREIGN PATENT DOCUMENTS

| | | |
|---|---|---|
| DE | 34 27 205 | 3/1985 |
| EP | 0 855 473 | 7/1998 |
| NL | 1011371 | 8/2000 |
| OA | 010356 | 10/2001 |

OTHER PUBLICATIONS

International Search Report, PCT International Patent Application No. PCT/NL2006/000504, dated Feb. 7, 2007.
Written Opinion of the International Searching Authority, PCT International Patent Application No. PCT/NL2006/000504, dated Feb. 7, 2007.

* cited by examiner

*Primary Examiner* — John Rivell
*Assistant Examiner* — Time Aigbe
(74) *Attorney, Agent, or Firm* — Kenyon & Kenyon LLP

(57) ABSTRACT

A device for reusing greywater includes: a water feed for supplying greywater; a collecting reservoir for collecting the supplied greywater; a storage tank for storing water; a siphoning device for siphoning water from the collecting reservoir to the storage tank; a water discharge for discharging stored water to a water user; a sewer outlet; and a control system.
A method of siphoning water includes: supplying water to a collecting reservoir; detecting a predetermined water level in the collecting reservoir; operating a filling valve subject to the detected water level; and siphoning water via a siphon connection from the collecting reservoir to the storage tank.

19 Claims, 5 Drawing Sheets

GREYWATER SYSTEM AND METHOD FOR APPLYING SAME

FIELD OF THE INVENTION

The present invention relates to a greywater device and method for applying thereof.

BACKGROUND INFORMATION

Diverse energy standards have been drawn up by government authorities in order to spare the environment. One of these is the Energy Performance Standard (EPS) which expresses the energy efficiency of a new dwelling in the so-called Energy Performance Coefficient (EPC). The EPC represents the energy consumption of a building relative to a similar reference building described in the standard (for dwellings and residential buildings in the Netherlands this is currently NEN 5128/2001). This EPC is calculated on the basis of the building properties (insulation value of walls, floors, glazing and so forth) and installations (for instance solar collectors, ventilation systems and heating). The lower the number, the greater the energy efficiency of the building. The Energy Performance Coefficient (EPC) can thus be deemed as a measure for the (average) energy quality of a building, including the technical installations. The level of the EPC is laid down in the Building Act in the form of a minimum EPC requirement, which is set at 0.8 as of Jan. 1, 2006. All newly built houses must comply with this maximum allowed EPC.

Energy consumption is determined on the basis of, among other factors, the energy consumption for heating, hot tap water, pumps, cooling, fans and lighting. If a newly built house does not achieve an EPC of 0.8, this means that additional measures such as solar panels and/or triple glazing must be applied, and this can markedly increase the cost of building a house.

One method of making efficient use of energy and environment is to reuse lightly contaminated water. Instead of mains water, which is treated with considerable effort and at a great cost in wastewater purification plants, less clean non-potable water can be used for some applications, such as, for instance, flushing the toilet. It is thus possible to envisage the use of collected rainwater and the reuse of lightly contaminated bath and shower water, also referred to as greywater. This saving of water furthermore results in a proportional reduction in the stress on the sewage system.

The use of the relatively warm greywater also has another favorable effect on the Energy Performance Coefficient (EPC): there is a reduction in the "cold source" which normally occurs when cold mains water is fed into and stored in a cistern. The system itself moreover also has a favorable effect on the EPC in the form of heat generation.

Netherlands Patent No. 1011371 describes a reservoir for greywater with a feed for greywater and a discharge connected to a greywater user such as a toilet or the like. The reservoir is provided with an outlet which connects to the sewer and which is provided with a valve to be opened at regular intervals by a time clock. Regular disposal of greywater prevents odor nuisance being caused.

SUMMARY

Example embodiments of the present invention may improve, in particular make more compact and/or more efficient, a greywater device.

According to example embodiments of the present invention, a greywater device includes: a water feed for supplying greywater; a collecting reservoir for collecting the supplied greywater; a storage tank for storing water; a siphoning device for mechanically siphoning water from the collecting reservoir to the storage tank; a water discharge for discharging stored water to a water user; a sewer outlet; and a control system.

An advantage of the above example embodiment is that, due to the application of a mechanical siphoning device operating substantially on the basis of the force of gravity, no additional energy is required. On the one hand this makes the device cheaper to purchase and maintain, and on the other cheaper and more energy-efficient in use; no electrical energy is after all used. This is favorable for the environment. It also limits the necessity for other expensive energy-saving measures, such as, for instance, additional insulating glass and/or solar panels.

Arranged on the top side of the collecting reservoir is an overflow which connects to a bypass conduit for diverting water to the sewer outlet. Water which is discharged via the overflow and the bypass conduit is collected by a siphoning device, which includes: a siphon connection for siphoning water from the collecting reservoir to the storage tank; a filling valve; and a receiving device for receiving supplied greywater, wherein the receiving device is connected to the filling valve.

The connection between the receiving device and the valve can take place mechanically or electrically.

Because greywater including bath and shower water is lightly contaminated, a separation is recommended. Example embodiments of the present invention may apply a separating principle which is based on a difference in specific weight between the water and the contaminants present in the water. The siphon connection for siphoning water from the collecting reservoir to the storage tank is therefore arranged substantially in the central part of the substantially vertically arranged collecting reservoir.

It may occur that the water requirement of the water user connected to the greywater device cannot be provided by the stored greywater. So as to also provide for delivery of the water requirement in these situations, the storage tank may be further provided with a mains water feed for filling the storage tank with mains water.

In order to prevent odor nuisance and, for instance, legionella and to be able to discharge all contamination accumulated in the device periodically and/or subject to user, the greywater device according to an example embodiment of the present invention may be provided with a draining device for draining greywater under the control of the control unit.

At least one cleaning unit may be arranged to provide cleaning of the greywater device. In an example embodiment, water supplied by the mains water feed is used by this cleaning unit.

An adding unit may be arranged for adding an additive to the water, such as a disinfectant, cleaning agent or a fragrance.

The greywater device may be accommodated in a support frame. An advantage of this arrangement is that a module is provided which can be placed in a relatively short period of time by an installer.

A cistern can also be integrated into the support frame. It is also energetically favorable to arrange a heat exchanger in, for instance, the cistern and/or the collecting reservoir or storage tank.

In the following description, exemplary embodiments are described in further detail with reference to the appended Figures.

DETAILED DESCRIPTION

Figure 1:
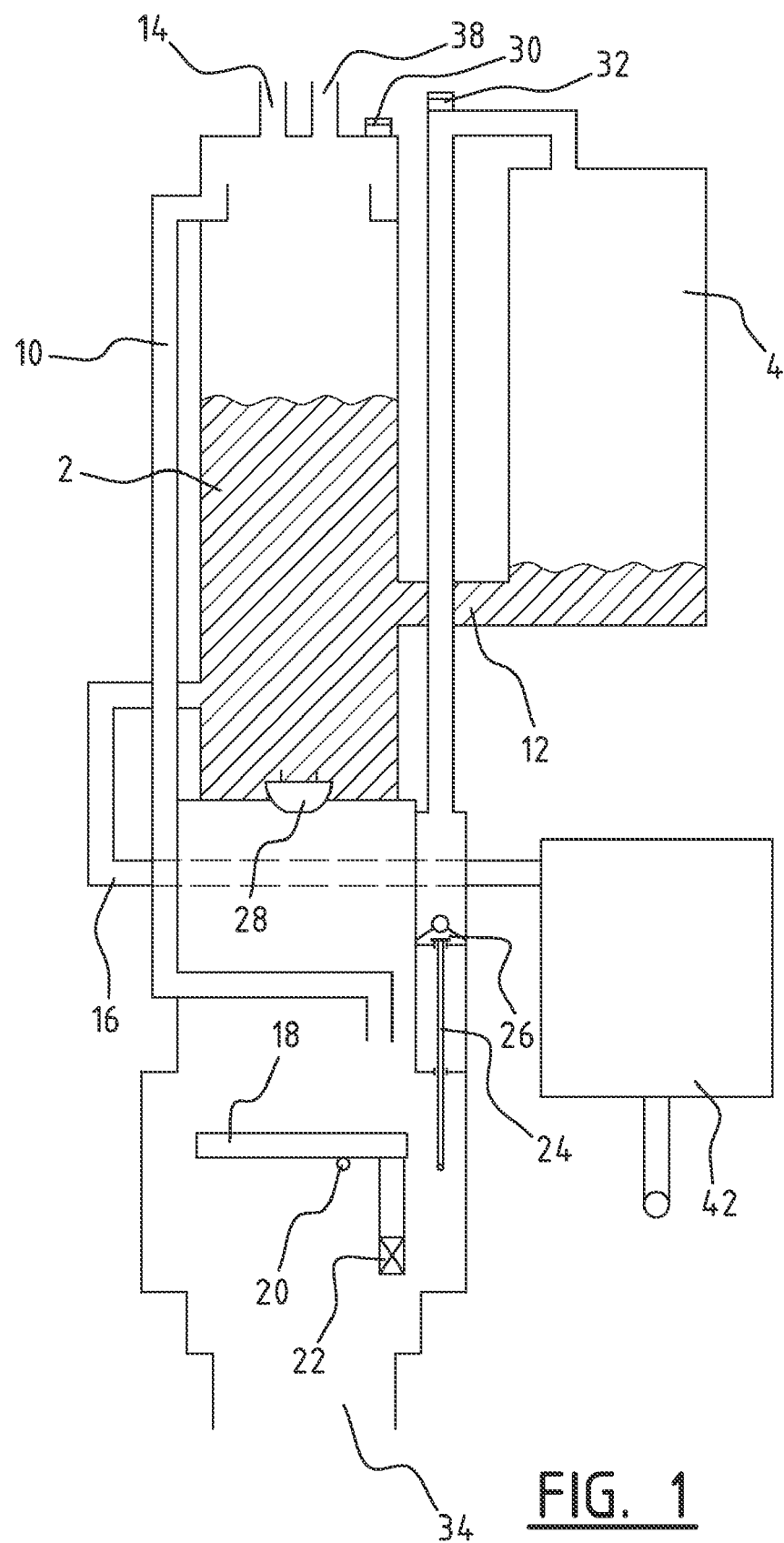
FIG. 1 shows a schematic view of a greywater device according to an example embodiment of the present invention in a rest position.

A greywater device according to an example embodiment is shown schematically in FIGS. 1 to 4 and includes: a collecting reservoir 2, a storage tank 4, an overflow 6 with a skimmer 8, a bypass conduit 10, a siphoning tube 12 connecting the collecting reservoir and the storage tank, a feed conduit for supplying greywater 14, a discharge conduit for discharging water to a water user, such as a toilet 16, an activating device in the form of a receiving vessel 18 which rotates about a shaft 20 and an arm with weight 22, a plunger rod 24 which operates a filling valve 26, a drainage valve 28, aerators 30 and 32, a sewer outlet 34 and further a control unit (ECU) 43 which is connected with sensors and actuators to the parts of the system to make it possible to take user-dependent action.

FIG. 1 shows the greywater device in a rest position, wherein the collecting reservoir is partially filled with water. Lightly contaminated water will be produced when use is made of shower and bath. Instead of allowing this water to disappear directly into the sewer, it is collected via a feed 14 in collecting reservoir 2, which will thereby become filled with greywater. Drainage valve 28 and filling valve 26 are both closed, whereby the water level in collecting reservoir 2 will rise when greywater is supplied via feed 14.

Greywater collected directly from bath and shower contains contaminants such as soap residues, flakes of skin and hair, thereby making a form of separation or filtering desirable. A separating principle is applied that is based on a difference in density or specific weight between the water and the contaminants present in the water.

On the top side of collecting reservoir 2 is arranged an overflow 6 where greywater flows away via a bypass conduit 10 in the direction of activating device, which in the shown example embodiment includes, among other parts, a receiving vessel 18 and a plunger rod 24. Contaminants with a density lower than that of water ($\rho_{contaminant} < \rho_{water}$), such as, for instance, soap residues, will float and therefore be drained together with the greywater via overflow 6 and bypass conduit 10 in the direction of the activating device. In order to prevent contaminants continuing to float on the top, a skimmer 8 is arranged for skimming off these contaminants in the direction of bypass conduit 10.

The relatively heavy contaminants, such as, for instance, sand residues, with a density which is greater than that of water ($\rho_{contaminant} > \rho_{water}$), will be collected due to settling at the bottom of collecting reservoir 2.

Because light contaminants will float and heavy contaminants will sink, the cleanest water will be situated substantially in the central part, i.e., between the top and bottom of collecting reservoir 2.

Figure 2:
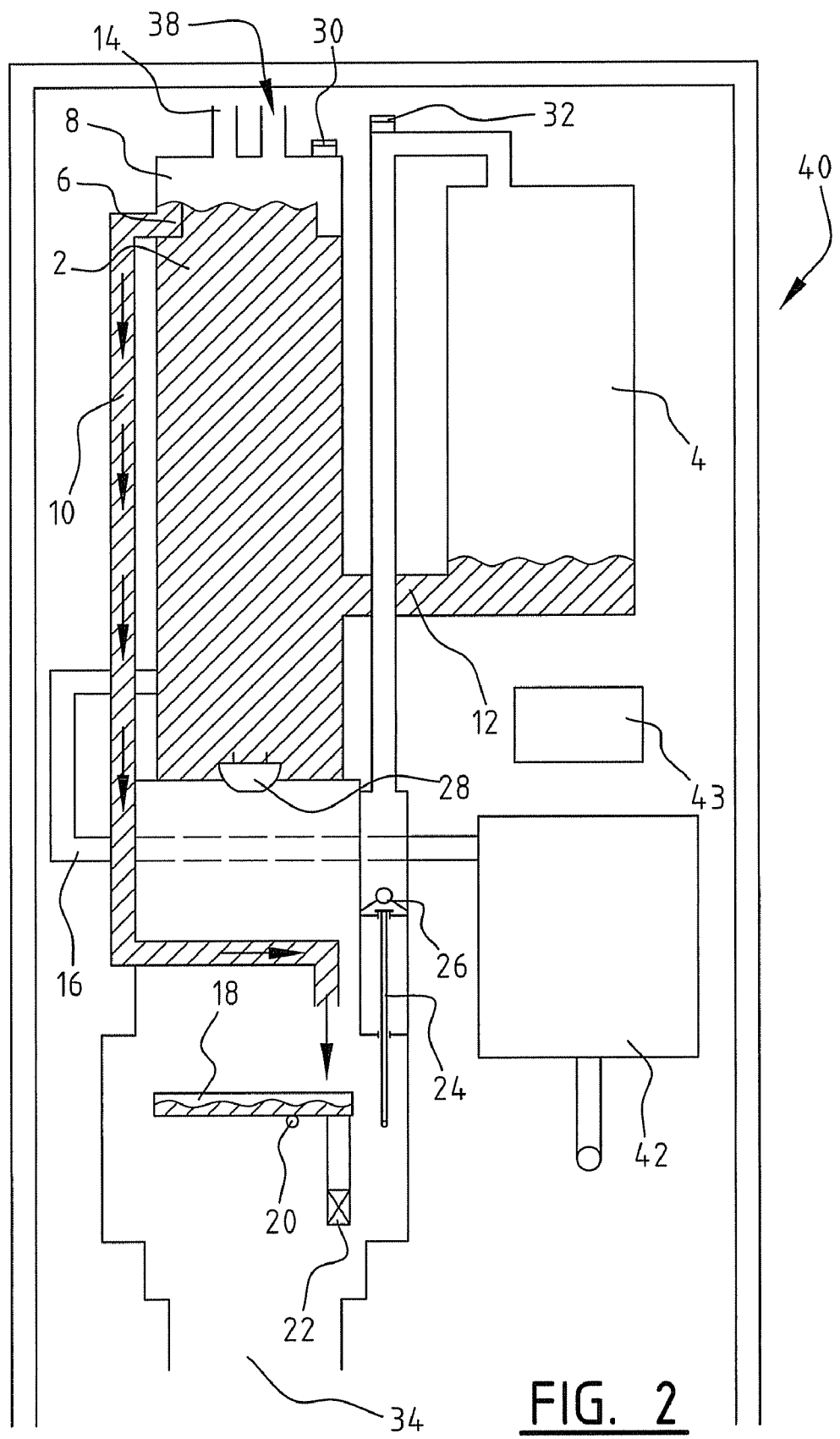
FIG. 2 is a schematic view of the greywater device shown in FIG. 1 when the greywater is being supplied.
Figure 3:
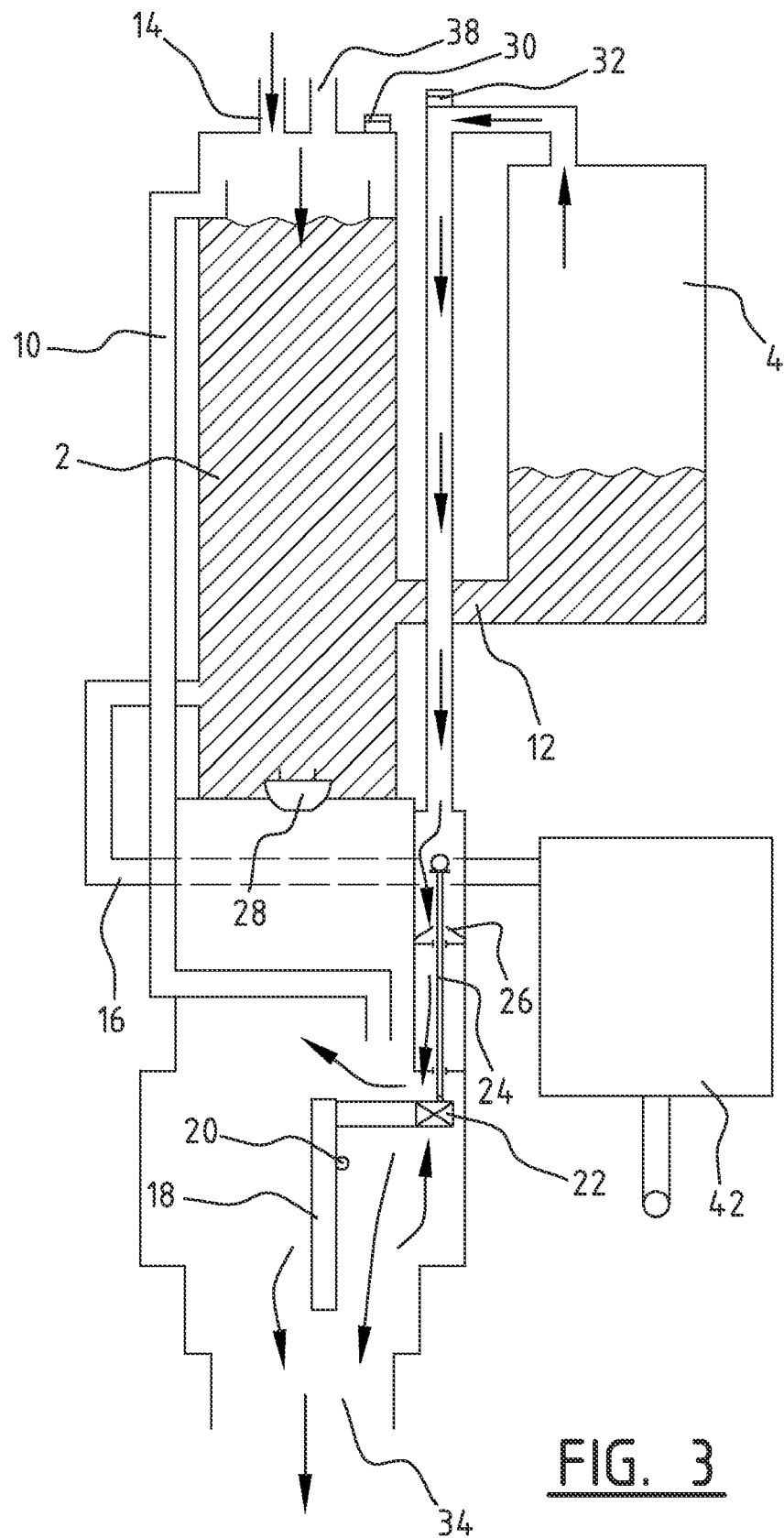
FIG. 3 is a schematic view of the greywater device shown in FIG. 1 when the collecting reservoir is filled with greywater.
Figure 5:
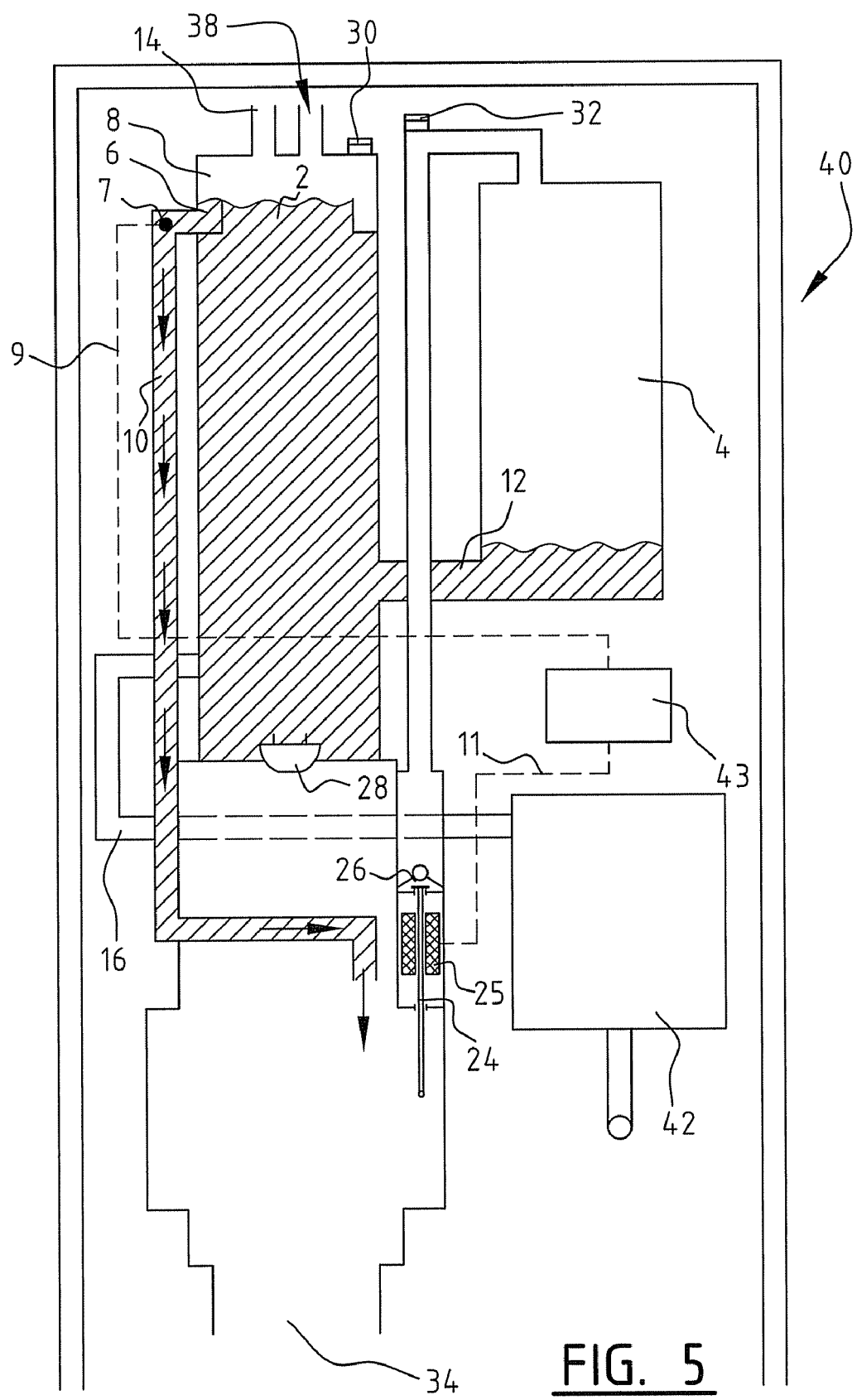
FIG. 5 is a schematic view of a greywater device according to an example embodiment of the present invention.

Water which flows away via overflow 6 and bypass conduit 10 at the top of collecting reservoir 2 will be received in a receiving vessel 18 (FIG. 2). This receiving vessel 18 is arranged asymmetrically on a shaft 20. By compensating this asymmetry with an adapted weight distribution, such as, for instance, with an arm and a weight 22, receiving vessel 18 is balanced such that in empty state the receiving vessel 18 is oriented substantially horizontally. When receiving vessel 18 is filled with water supplied via bypass conduit 10, the balanced position will be disturbed as a consequence of the asymmetrical form and, as a result of this imbalance, receiving vessel 18 will begin to tilt (FIG. 3). Due to this tilting the receiving vessel 18 will, for instance, by its arm, displace a transfer member, for instance, in the form of a plunger rod 24. Filling valve 26 is opened by the displacement of plunger rod 24. It will be apparent to the skilled person that it is also possible here, for instance, to arrange a sensor which detects a movement of receiving vessel 18 and then electrically operates filling valve 26. It is noted for the sake of completeness that such a sensor can also be arranged at other suitable locations, such as, for instance, in bypass conduit 10, where this sensor can detect water overflowing via overflow 6 into the bypass conduit. Although it will be apparent to the skilled person, various aspects are further described in FIG. 5, where a sensor 7 is arranged. This sensor 7 is connected via wiring 9 to control unit 43 which, subject to the signal received from sensor 7, energizes via wiring 11 a coil 25 arranged round plunger rod 24.

Prior to opening of the filling valve there prevails in storage tank 4 a balance between the air pressure present above the water level and the water pressure. Because collecting reservoir 2 has meanwhile been filled and the water level in collecting reservoir 2 has risen above the water level in storage tank 4, the water pressure in storage tank 4 has increased. As a result, the air present in storage tank 4 above the water level will be compressed to some extent. Through opening of filling valve 26 the air pressure in storage tank 4 will decrease to the ambient air pressure. The equilibrium of forces between the air and the water in storage tank 4 is hereby disturbed, and water will be siphoned from collecting reservoir 2 to storage tank 4 via siphoning tube 12. The water level in collecting reservoir 2 will hereby fall and the water level in storage tank 4 will rise.

When receiving vessel 18 tilts and filling valve 26 opens by plunger rod 24, receiving vessel 18 will drain. The imbalance will hereby disappear and receiving vessel 18 will move back again to its balanced position, wherein receiving vessel 18 is oriented substantially horizontally.

As long as greywater is supplied via feed 14, the water level in collecting reservoir 2 will rise until water once again flows via overflow 6 of collecting reservoir 2 into receiving vessel 18 via bypass conduit 10. Receiving vessel 18 will hereby tilt once again. As a result filling valve 26 will be opened and—through repetition of the above—the storage tank will fill in pulsating manner until the water level in storage tank 4 and collecting reservoir 2 reach the same level.

Figure 4:
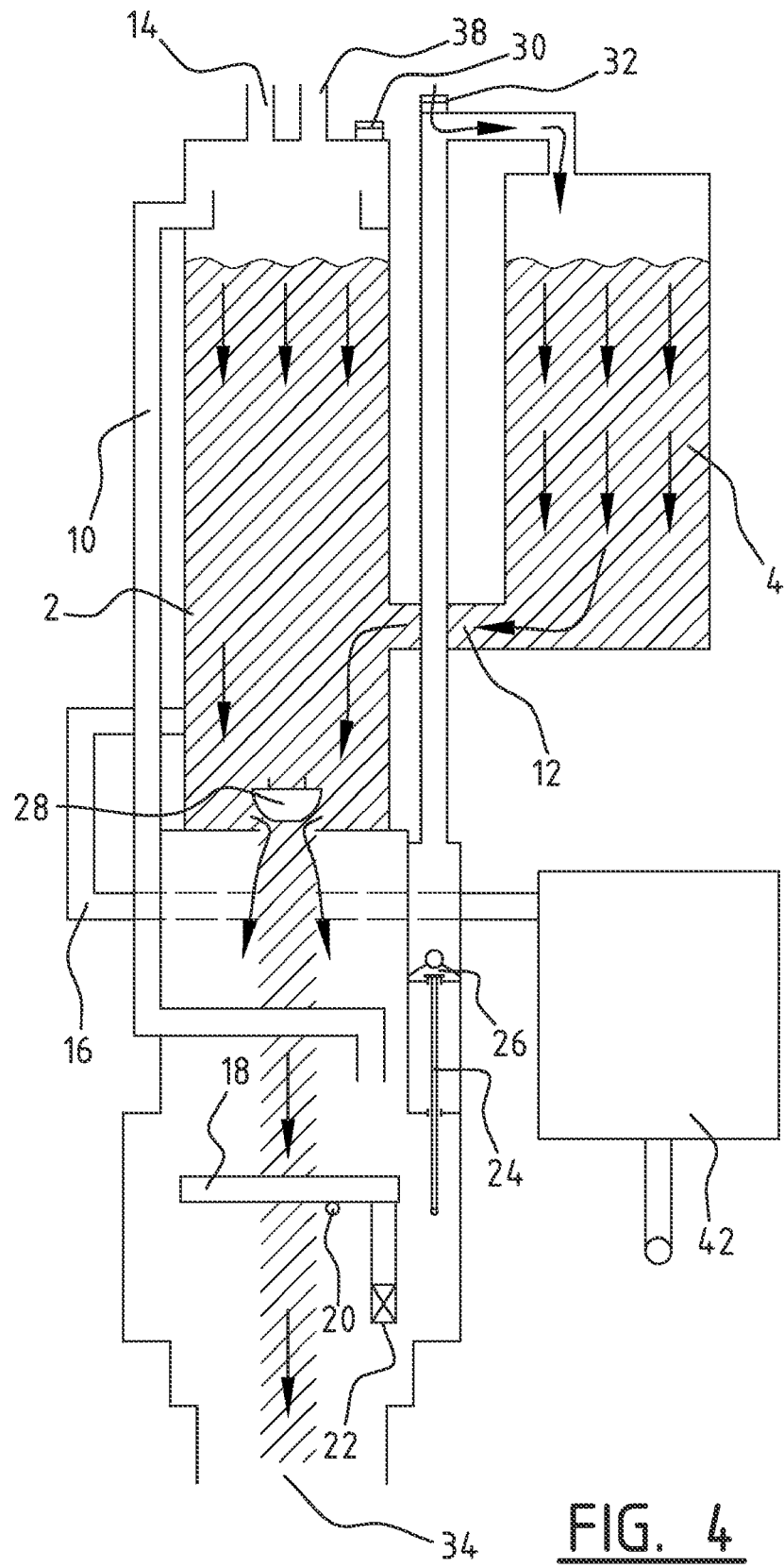
FIG. 4 is a schematic view of the greywater device shown in FIG. 1 when the system is being drained.

The system will be drained periodically in order to discharge contaminants and to prevent the occurrence of odor nuisance which may occur when the greywater has been stored for too long in the system. The settled contaminants situated at the bottom of collecting reservoir 2 are discharged periodically by opening drainage valve 28 on the underside of collecting reservoir 2 and opening aerators 30 and 32 on the top side (FIG. 4). The stored water will hereby disappear together with all contaminants into the sewer via sewer outlet 34. The control system (EcoPlay Control Unit (ECU)) will control this drainage subject to parameters such as the time elapsed since the last filling. In the case of power failure, the greywater present in the system can, for instance, so as to prevent legionella, be drained as final action, whereafter the system is filled with normal mains water. A mains water feed 38 is arranged for this purpose.

Mains water feed 38 is further provided so as to be able to continue to meet the requirement of the water user, such as the toilet, in the case too little greywater is being supplied.

It is possible to spray the walls of collecting reservoir 2 using the mains water supplied via mains water feed 38. Limescale that may be present can be removed by opening drainage valve 28, preferably during spraying or thereafter.

The greywater device may be accommodated in a support frame 40 which can be placed simply and quickly by an installer. The whole module can, for instance, be mounted on a wall with a number of expansion bolts. The feed and discharge conduits must then be installed, for instance, with clamp fittings. An example of the dimensions such a module will have is a height of about 2.6 m and a width of about 0.9 m. The module may be arranged such that variations in these dimensions can be readily compensated. A cistern 42 may be integrated into support frame 40.

Example embodiments of the present invention further provide a method for siphoning water in a device for greywater.

Although they are preferred embodiments of the invention, the above described example embodiments are intended only to illustrate the present invention and not in any way to be limiting. The rights sought are defined by the following claims, within the scope of which many modifications can be envisaged.

The invention claimed is:

1. A device for reusing greywater, comprising:
    a water feed adapted to supply greywater;
    a substantially vertically arranged collection reservoir adapted to collect the supplied greywater;
    a storage tank adapted to store water;
    a siphon device adapted to siphon water from the collection reservoir to the storage tank, the siphon device including:
        a siphon connection adapted to siphon water from the collection reservoir to the storage tank and arranged substantially in a vertically-central part of the collection reservoir,
        a filling valve, and
        a receiver device connected to the filling valve and adapted to receive supplied greywater;
    a water discharge adapted to discharge stored water to a water user;
    a sewer outlet;
    a control system;
    an overflow arranged on the top side of the collection reservoir; and
    a bypass conduit adapted to divert water to the sewer outlet.

2. The device according to claim 1, wherein a mechanical transfer member is provided for the connection between the receiver device and the filling valve.

3. The device according to claim 1, wherein the connection between the receiver device and the filling valve is electrical.

4. The device according to claim 1, wherein the receiver device has an asymmetric form.

5. The device according to claim 1, further comprising a sensor adapted to detect a water level in the collection reservoir, wherein the control system is adapted to control the siphon device subject to the water level detected by the sensor.

6. The device according to claim 1, further comprising a sensor adapted to detect water in the bypass conduit, wherein the control system is adapted to control the siphon device subject to the water detected by the sensor.

7. The device according to claim 1, wherein the collection reservoir includes a mains water feed adapted to fill the collection reservoir with mains water.

8. The device according to claim 1, further comprising a drainage device adapted to drain greywater under control of the control system.

9. The device according to claim 1, further comprising at least one cleaning unit arranged for cleaning the device.

10. The device according to claim 1, wherein the cleaning unit is adapted to use water supplied by a mains water feed to clean the device.

11. The device according to claim 1, further comprising a support frame.

12. The device according to claim 11, further comprising a cistern arranged in the support frame.

13. The device according to claim 1, further comprising an activation device adapted to open the filling valve in accordance with the supplied greywater overflowing the collection reservoir, the filling valve, in a closed position, sealing the storage tank from ambient air, the filling valve, in an open position, opening the storage tank to the ambient air to release positive pressure in the storage tank caused by a pressure of a greater height of the supplied greywater in the collection reservoir than in the storage tank to thereby siphon the greywater from the collection reservoir to the storage tank.

14. The device according to claim 1, wherein the device is adapted to perform a method including:
    supplying water to a substantially vertically arranged collection reservoir;
    detecting a predetermined water level in the collection reservoir;
    operating a filling valve subject to the detected water level;
    siphoning water via a siphon connection from the collection reservoir to the storage tank, the siphon connection being arranged substantially in a vertically-central part of the collection reservoir;
    water overflowing at an overflow on a top side of the collection reservoir when the collection reservoir has been filled;
    detecting water overflowing at the overflow; and
    operating the filling valve subject to the detected overflowing water.

15. A method, comprising:
    supplying water to a substantially vertically arranged collection reservoir;
    detecting a predetermined water level in the collection reservoir;
    operating a filling valve subject to the detected water level;
    siphoning water via a siphon connection from the collection reservoir to the storage tank, the siphon connection being arranged substantially in a vertically-central part of the collection reservoir;
    water overflowing at an overflow on a top side of the collection reservoir when the collection reservoir has been filled;
    detecting water overflowing at the overflow; and
    operating the filling valve subject to the detected overflowing water.

16. The method according to claim 15, further comprising:
    guiding the water coming via the overflow to a receiver device via a bypass conduit;

moving the receiver device when the receiver device is filled with the water to operate the filling valve.

17. The method according to claim 15, wherein the water level is detected in the detecting step by a sensor, and the filling valve is electrically operated in the operating step subject to the water level detected by the sensor.

18. The method according to claim 15, wherein the water overflowing at the overflow is detected in the overflow detecting step by a sensor, and the filling valve is electrically operated in the operating step subject to the overflowing water detected by the sensor.

19. The method according to claim 15, wherein the method is performed by a device including:
   a water feed adapted to supply greywater;
   a substantially vertically arranged collection reservoir adapted to collect the supplied greywater;
   a storage tank adapted to store water;
   a siphon device adapted to siphon water from the collection reservoir to the storage tank, the siphon device including:
      a siphon connection adapted to siphon water from the collection reservoir to the storage tank and arranged substantially in a vertically-central part of the collection reservoir,
      a filling valve, and
      a receiver device connected to the filling valve and adapted to receive supplied greywater;
   a water discharge adapted to discharge stored water to a water user;
   a sewer outlet;
   a control system;
   an overflow arranged on the top side of the collection reservoir; and
   a bypass conduit adapted to divert water to the sewer outlet.

* * * * *